March 4, 1958 D. J. DONAHOE 2,825,302
MULTIPLE LEVEL CONCRETE WATERING TROUGH
Filed April 13, 1955 2 Sheets-Sheet 1

Inventor
Donald J. Donahoe
by Talbert Dick & Adler
Attorneys

Witness
Edward P. Seeley

March 4, 1958  D. J. DONAHOE  2,825,302
MULTIPLE LEVEL CONCRETE WATERING TROUGH
Filed April 13, 1955  2 Sheets-Sheet 2
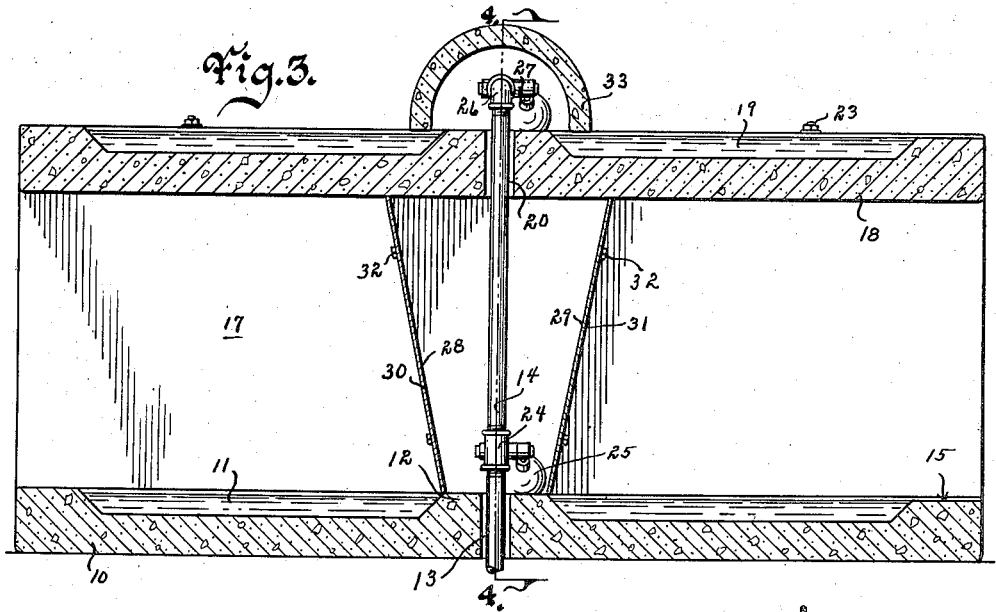
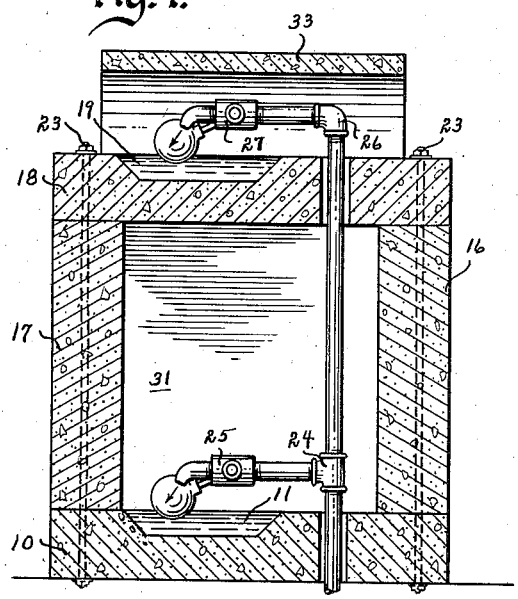
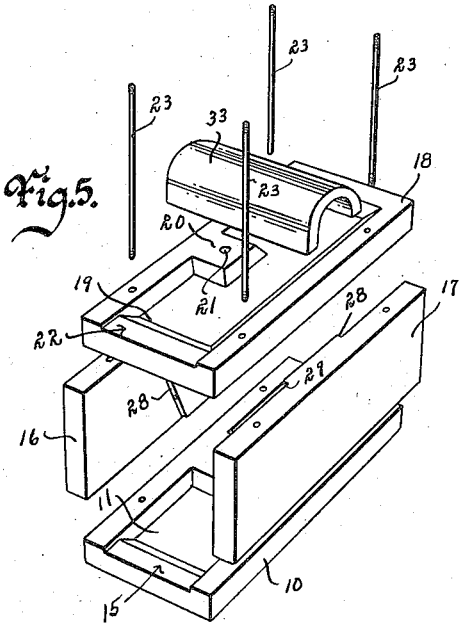
Inventor
Donald J. Donahoe
by Talbert Dick & Adler
Attorneys
Witness
Edward P. Seeley United States Patent Office 2,825,302
Patented Mar. 4, 1958

2,825,302

MULTIPLE LEVEL CONCRETE WATERING TROUGH

Donald J. Donahoe, Fort Dodge, Iowa

Application April 13, 1955, Serial No. 501,131

3 Claims. (Cl. 119—78)

This invention relates to animal watering devices and more particularly to one constructed substantially all of Portland cement.

Stock watering troughs and tanks are universally used, usually consisting of separate tanks for the larger animals such as cattle and horses and relatively small containers for the smaller animals such as swine, fowls, and the like. Some attempt has been made to combine these two types of waterers into a single unit especially under conditions where the water supply is automatic. Such equipment is illustrated in my United States issued Patent No. 2,635,580, on a Temperature Controlled Water Tank, issued April 12, 1953. These watering devices are constructed of sheet metal and have a considerable number of objections. They obviously are of light weight and subject to damage by both animals and storms. They are costly to manufacture, easily bent in shipment, and usage, and have a relatively short life due to rusting. Also, the weight of the water in them tends to bulge and distort them.

Therefore, one of the principal objects of my invention is to provide a strong heavy stock waterer.

More specifically the object of this invention is to provide a stock waterer that is constructed substantially of pre-cast parts made of Portland cement, an aggregate and water.

A further object of this invention is to provide a combination large and small animal watering device constructed of assembled pre-cast masonry parts.

A still further object of this invention is to provide a heavy pre-cast watering device that is rigid and cannot be distorted nor damaged by the weight of the water in it, the animals using it, nor weather elements.

A still further object of my invention is to provide a stock waterer that is not subject to rust.

A still further object of this invention is to provide a stock watering device that cannot be damaged by the water therein freezing.

Still further objects of my invention are to provide a stock waterer that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 3 is a longitudinal sectional view of the device taken on line 3—3 of Fig. 2, Fig. 4 is a cross sectional view of the waterer taken on line 4—4 of Fig. 3, and Fig. 5 is an illustrative exploded view reduced and in perspective of the various parts that go to make up my waterer.

Figure 1:
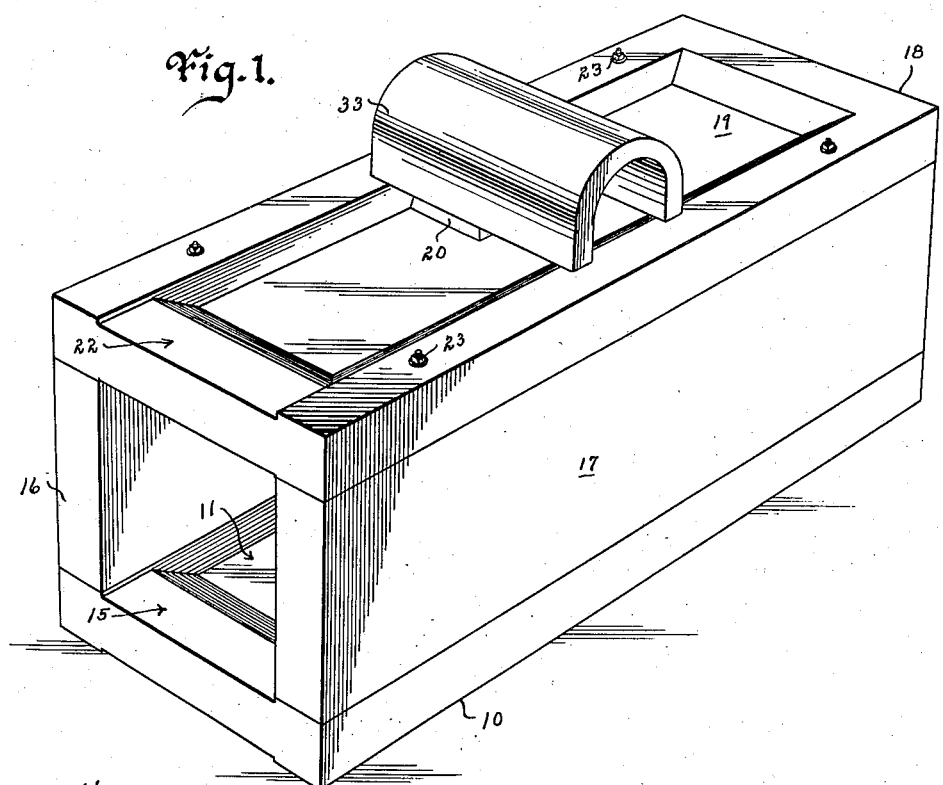
Fig. 1 is a perspective view of my watering device ready for use.
Figure 2:
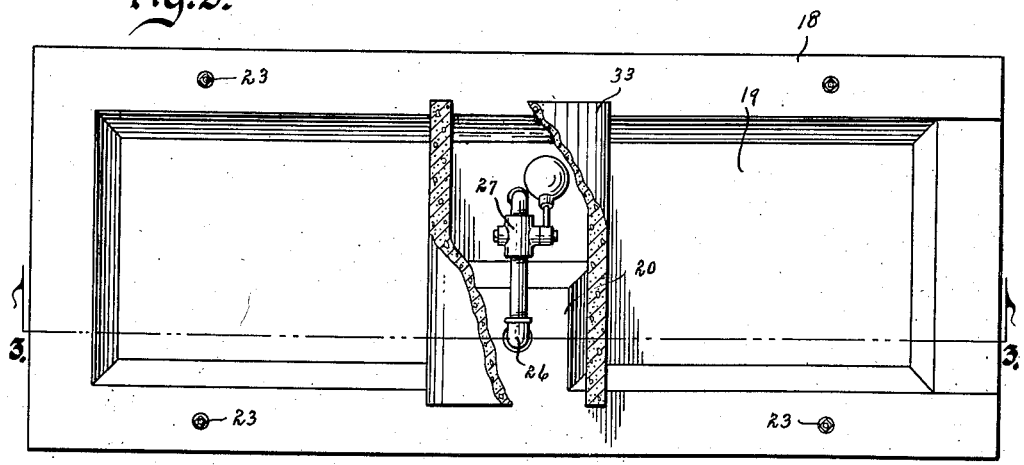
Fig. 2 is a top plan view of my waterer with a section cut away to more fully illustrate its construction.

I have used the numeral 10 to designate the cast base of my waterer, preferably rectangular in shape and having a trough area 11 cast in its top. The walls of this trough slope upwardly and outwardly as shown in Fig. 2. The numeral 12 designates a raised portion cast in and at one side of the trough area and has a vertical hole 13, either round or rectangular, for the vertical passage of a water supply pipe 14. At least one end of the trough wall, at 15, is in a horizontal plane below the top horizontal plane of the portion 12, so that if the trough area becomes too full of water, such surplus water would run out over the end of the base instead of down the hole 13. The numerals 16 and 17 designate two spaced apart vertical side walls resting on the two side edge portions respectively of the base 10 as shown in Fig. 4. The numeral 18 designates the top cast slab resting on and extending between the two walls 16 and 17. The cast parts, 10, 16, 17 and 18, when assembled, has the appearance of an elongated box, open at each end. Cast in the top of the slab 18 is a trough area 19. This slab 18 is a substantial duplicate of the base 10. Its trough walls slope downwardly and inwardly and it also has a raised portion 20 in its trough area. This portion 20 has a hole 21 directly above the hole 13 so that the water supply pipe 14 may extend upwardly through both holes 13 and 21 as shown in Fig. 3. Also at least one end wall of the trough 19 is in a horizontal plane below the top horizontal plane of the portion 20 as shown at 22. The sides of the troughs 11 and 19 are sloped to aid in cleaning and also to prevent breakage of the parts by water freezing therein. The base slab and walls may be cast with registering holes and by passing bolt means 23 through the holes as shown in Fig. 4, the parts will be rigidly secured together. Directly above the portion 12 I have imposed a T-connection 24 in the pipe 14. This T-connection is connected to a float valve means 25 which extends over and into the trough area 11. The numeral 26 designates an L-connection on the upper end of the pipe 14 and which is above the portion 20. This L-connection 26 is connected to a float valve means 27. The pipe 14 is designed to be in communication with a source of water under pressure. The float valves 25 and 27 will maintain the proper height of the water in the trough portions 11 and 19. If, however, the float portion would fail the water will run over the ends of the members 10 and 18 rather than down through the holes 13 and 21. Both of the float valve means must be protected from damage or contact with the animals using my waterer. To protect the valve means 25 I have provided a pair of ledges 28 and 29 on the inner side of each of the walls 16 and 17. These ledges extend upwardly and laterally from the portion 12 and spread apart and away from each other as they progress upwardly. Extending between the two side walls I have two wall sheet members 30 and 31. One sheet member engages the ledge 28 on one wall and the ledge 29 on the other wall and the other sheet member engages the ledge 29 of the first wall and the ledge 28 of the second wall. These wall sheet members 30 and 31 may be of any suitable material such as galvanized iron and are detachably held to the ledge by any suitable means such as cap screws 32. By this arrangement the float valve 25 and pipe 14 will be shielded from the smaller animals drinking from each end of the device and from the trough area 11. To gain access to the float valve area one or both of these wall shields 31 are removed. To protect the upper end of the pipe 14 and its float valve means 27, any type of housing may be placed over the float valve and the portion 20. In the drawings I show a cast hood 33 extending across the slab 18 and over the valve means 27 as shown in Fig. 1. If desired, this hood 33 may be detachably secured to the slab 18 by any suitable means such as grooves, bolts, or the like. So that the small animals using the trough 11 will not be harmed by the sharp ended bottom edge of the slab 18, I have slightly beveled this edge as shown in Fig. 1 and Fig. 3.

Once assembled my watering device is substantially rust-proof inasmuch as substantially all of its parts are cast from Portland cement, aggregate and water. Due to the heavy construction of the waterer it is not easily damaged by either the animals or the elements, the parts that are pre-cast include the base 10, the walls 16 and 17, the slab 18, and the hood 33. If desired, the hood 33 may be made of other materials. As before indicated the base 10 and slab 18 are substantially duplicates of each other and also the wall 16 may be an exact duplicate of the wall 17. If it is desired to disassemble the parts as shown by the exploded view in Fig. 5, the bolt means 23 are removed as well as the shields 30 and 31. Obviously the larger animals will use the trough 19 and this may be accomplished at the same time that the animals are using the trough 11. Thus I have provided a highly desirable watering trough that may be used as a unit for watering simultaneously both the small and the large animals. If there are only small animals to water, the walls 16 and 17 and the slab 18 may be left off the base 10.

Some changes may be made in the construction and arrangement of my multiple level concrete watering trough, without departing from the real spirit and purpose of my invention, and it is my intention to cover by my claims, any modified forms of structure or use of mechanical equivalents which may be reasonably included within their scope.

I claim:

1. A pre-cast base having a trough with the walls of the trough extending inwardly and downwardly, a raised portion in the central portion of said trough pre-cast with said base having a vertical hole for receiving a water supply means; said raised portion extending upwardly to a horizontal plane above the horizontal plane of at least one portion of said base that is adjacent said trough, two spaced apart vertical pre-cast side walls on the top of said base, a pre-cast slab on the top of said walls having a trough in its top surface, a pair of spaced apart ledges on the inner side of each of said side walls, and two shield members extending in spaced relationship between said side walls and secured to said ledges.

2. A pre-cast base having a trough with the walls of the trough extending inwardly and downwardly, a raised portion in the central portion of said trough pre-cast with said base having a vertical hole for receiving a water supply means; said raised portion extending upwardly to a horizontal plane above the horizontal plane of at least one portion of said base that is adjacent said trough, two spaced apart vertical pre-cast side walls on the top of said base, a pre-cast slab on the top of said walls having a trough in its top surface, a pair of spaced apart ledges on the inner side of each of said side walls, and two shield members extending in spaced relationship between said side walls and detachably secured to said ledges.

3. A pre-cast base having a trough with the walls of the trough extending inwardly and downwardly, a raised portion in the central portion of said trough pre-cast with said base having a vertical hole for receiving a water supply means; said raised portion extending upwardly to a horizontal plane above the horizontal plane of at least one portion of said base that is adjacent said trough, two spaced apart vertical pre-cast side walls on the top of said base, a pre-cast slab on the top of said walls having a trough in its top surface, a pair of spaced apart ledges on the inner side of each of said walls, and two shield members extending in spaced relationship between said side walls and secured to said ledges and with said first mentioned raised portion of said base in a plane between them.

References Cited in the file of this patent

UNITED STATES PATENTS

| | | |
|---|---|---|
| 235,701 | Ray | Dec. 21, 1880 |
| 925,948 | Robertson | June 22, 1909 |
| 930,458 | Butler | Aug. 10, 1909 |
| 1,086,785 | Parkins | Feb. 10, 1914 |
| 2,365,862 | Bufton | Dec. 26, 1944 |
| 2,588,737 | Ludi | Mar. 11, 1952 |
| 2,614,532 | Steel | Oct. 21, 1952 |